Dec. 20, 1960
R. C. ROPP ET AL
2,965,785
PYROPHOSPHATE PHOSPHOR
Filed Feb. 21, 1958
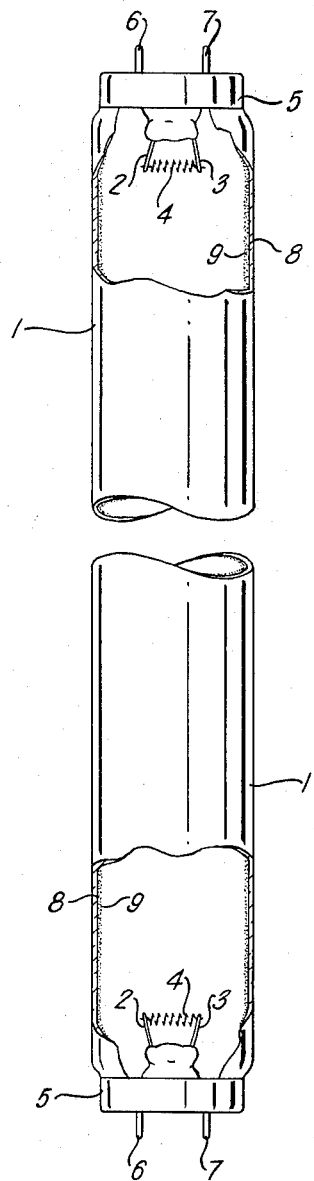
INVENTORS
RICHARD W. MOONEY
RICHARD C. ROPP
BY
ATTORNEY

United States Patent Office

2,965,785
Patented Dec. 20, 1960

2,965,785
PYROPHOSPHATE PHOSPHOR

Richard C. Ropp and Richard W. Mooney, Towanda, Pa., assignors, by mesne assignments, to Sylvania Electric Products Inc., Wilmington, Del., a corporation of Delaware Filed Feb. 21, 1958, Ser. No. 716,739

5 Claims. (Cl. 313—109)

This invention relates to phosphors for excitation by ultraviolet radiation, cathode rays, X-rays and the like, and especially to phosphors for fluorescent lamps, and to fluorescent lamps containing such phosphors. In particular, the invention relates to a tin-activated strontium pyrophosphate for use in such lamps. Some of the strontium can be replaced by other metals.

Strontium pyrophosphate phosphors, containing calcium if desired, have been previously known, and some very effective phosphors of that type have been shown for example, in copending U.S. patent application Serial No. 220,356, filed April 9, 1951, now U.S. Patent 2,826,553, by Keith H. Butler. That application states that the tendency to gray discoloration of the phosphor is reduced by the use of a slight excess of phosphate.

We find that when the phosphor is mixed with a binder, applied to the inner surface of a fluorescent lamp tube, and baked out at the temperatures usual in commercial practice to remove the binder, the presence of too great an excess of phosphate is found to be deleterious, and actually produces a graying of the phosphor in the lamp after the bake-out. For best results under such conditions, some additional requirements are necessary.

The graying in the Butler application was the graying of the phosphor during its manufacture, that is, during the firing of the raw materials to make it into a phosphor. This kind of graying is due to the reduction of tin to the metallic state, and can be reduced by the use of an excess of phosphate. But as pointed out above, we have found that the use of too great an excess actually produces another graying problem, namely, a graying on heating the phosphor during bake-out, after applying it to a fluorescent lamp envelope in a coating suspension having an organic binder.

This type of graying is due to the retention of partially oxidized organic binder or carbonaceous material in the coating. The phosphates appear to have flame-retardent properties when a large excess of phosphate is present.

The latter type of graying is a problem, not in the manufacture of the phosphor, but in its application to a lamp. Nonetheless, we find that the use of particular proportions of ingredients in the phosphor will enable its application to the lamp without serious graying on bake-out.

We have discovered that if the ratio to the phosphate radical of strontium plus all other cation metals present, including the tin activator, is substantially stoichiometric, so that there will be no excess of the phosphate radical over that necessary to combine with them all, then the phosphor can be baked out in a lamp in the usual manner without deleterious graying. This is a different stoichiometry than that in which the tin is not included. Among the metals other than calcium which can be used to replace part of the strontium, are barium, magnesium, zinc, cadmium and aluminum. The amount of strontium replaced is preferably less than half on a gram-atom basis, that is the gram-atom ratio of strontium to the replacing metal should be 1/1 or greater.

We have also discovered that the brightness of emission from the phosphor under ultraviolet excitation is considerably greater when the amount of strontium plus tin plus other metals is stoichiometric with respect to the phosphate radical, that is if it is equal to 2 gram-atoms for each mol of the phosphate ($P_2O_7$) radical.

Other features, advantages and objects of the invention will be apparent from the following specification, taken in connection with the accompanying drawing, in which the figure shows a fluorescent lamp with a coating of phosphor according to one embodiment of the invention.

In the figure, a sealed, tubular, glass envelope 1 has lead-in wires 2, 3 at each end with an oxide-coated filamentary cathode 4 supported between them in the usual manner. The envelope 1 has a base 5 of the usual type fixed at each end, the contact pins 6, 7 extending from the base and connected respectively to lead-in wires 2, 3. The envelope 1 contains a filling of inert gas such as argon at a pressure for example of about 2 millimeters of mercury, and a small amount of mercury, sufficient to give a mercury pressure of about 10 microns during normal operation.

On the inside surface 8 of envelope 1 is a fluorescent coating 9 of phosphor powder containing strontium pyrophosphate, activated by tin in the stannous state, and having a gram-atom amount of strontium plus tin equal to 2.00 for each gram-mol of the phosphate radical $P_2O_7$. Other phosphors according to the invention can be used.

In the preparation of our phosphors, we prefer to start with secondary calcium phosphate, secondary strontium phosphate, and diammonium hydrogen phosphate, combined with either stannous oxide or stannic oxide as a source of tin, as described in United States patent application Serial No. 699,693, filed November 29, 1957, by Richard C. Ropp. However, it is possible to use calcium and strontium pyrophosphates or an ammonium phosphate combined with a calcium and/or strontium salt which breaks down to the oxide on heating to form the matrix material, and to introduce the tin as a similar heat decomposable salt or as a phosphate or a halide. Carbonates, oxalates, acetates, and nitrates are examples of suitable salts decomposable by heat. Correct proportions of the various raw materials may be mixed by ball milling dry, by ball milling in water or acetone, or by hammermilling, or by other suitable methods. After the mixture is prepared, it is fired in covered silica crucibles at a temperature which is preferably between 2000° F. and 2200° F., but not limited to that range, to form the fluorescent phosphor. The optimum firing time is dependent upon the size of crucible used. For a 2-liter crucible it is about 2 hours.

In Table I below, the effect of increasing the phosphate concentration above that corresponding to the normal pyrophosphate composition is shown for phosphors containing 2.00 gr.-atoms (Ca+Sr) and 0.02 grm.-atoms of tin. The material forms approximately 1.00 gm.-mols of the calcium strontium pyrophosphate. The output of the phosphor is expressed as percentage of the reading obtained with an arbitrary blue emitting phosphor, namely, barium titanium phosphate, with the powders on a standard plaque excited by resonance radiation from a low pressure mercury arc lamp, in the "Plaque" column and with the phosphor in otherwise standard and identical 40 watt fluorescent lamps in the "LPW" column. The output is read on a photomultiplier unit using a blue filter in front of the photomultiplier, the readings being proportional to the blue light output. The readings in lumens per watt (LPW) for lamps made from these phosphors, together with the corresponding $x$, $y$ color coordinates, after 100 hours of operation, and the characteristics displayed by this phosphor system during "bake-out," are also shown. The efficiency of lamps using the phosphor is seen to increase with excess phosphate up to a ratio of 2.06 $PO_4$ to 2.00 (Ca+Sr) and the blue output of the phosphor when not in a lamp remains essentially constant up to 2.15 $PO_4$ to 2.00 (Ca+Sr). However, it may also be noticed that the phosphor becomes increasingly hard with the higher amounts of excessive phosphate and that the highest LPW reading is reached at a $PO_4$ to (Ca+Sr) ratio of 2.06 to 2.00. Two moles in the starting materials (e.g., in the $CaHPO_4$ and similar materials) become one mole of $P_2O_7$ in the fired phosphor, so in terms of the latter the values would be one-half those given for $PO_4$.

Only one of the samples made into lamps baked out properly; namely, that sample which had a $PO_4$ to (Ca+Sr) ratio of 2.02 to 2.00. Thus, it would appear that an excess of phosphate over that which is compensated for by the (Ca+Sr+Sn) results in poor bake-out characteristics of the phosphor. To state this in another manner, optimum bake-out characteristics are observed when the following relationship holds where the symbols represent gm.-atom quantities:

$$Ca + Sr + Sn = P$$

Table I

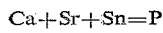

| Ca | Sr | Sn | $PO_4$ | Boue Plaque, Percent of BTP | Cake Hardness | LPW, 100 hr. | $x$ | $y$ | Bakeout |
|---|---|---|---|---|---|---|---|---|---|
| 0.75 | 1.25 | 0.02 | 2.00 | 68 | Soft | ---- | ---- | ---- | Good. |
| ---- | ---- | ---- | 2.02 | 89 | Soft | 21.8 | .193 | .232 | Poor. |
| ---- | ---- | ---- | 2.04 | 100 | Compact | 22.1 | .196 | .232 | Poor. |
| ---- | ---- | ---- | 2.06 | 124 | Compact | 22.3 | .191 | .221 | Poor. |
| ---- | ---- | ---- | 2.08 | 119 | Hard | 19.5 | .196 | .230 | Poor. |
| ---- | ---- | ---- | 2.10 | 126 | Hard | 18.4 | .196 | .230 | Poor. |
| ---- | ---- | ---- | 2.15 | 119 | Very hard | ---- | ---- | ---- | |
| ---- | ---- | ---- | 2.20 | 93 | Fused | ---- | ---- | ---- | |

Tables II and III below show the effect of tin concentration on a phosphor containing 2.00 gm.-atoms (Ca+Sr) and 2.05 and 2.06 gm.-atoms of $PO_4$, respectively. These combine to form approximately 1.00 gm.-mols of the calcium strontium pyrophosphate. Characteristics of the phosphor are described as above in Table I. Considering first Table II in which the ratio of $PO_4$ to (Ca+Sr) is 2.05 to 2.00, it is easily seen that the efficiency of the phosphor in a lamp increases with increasing concentration of tin up to approximately 0.04 gm. atoms of tin and remains constant to about 0.07 gm.-atoms of tin. This is especially evident in the 100 hour LPW values. It will also be noticed that the two lowest tin concentrations showed poor bake-out, but that the bake-out of all other phosphors was satisfactory. A color shift occurs with increasing concentration of tin, the phosphor becoming bluer up to a concentration of 0.04 gm.-atoms of tin and remaining essentially constant at the higher concentrations. It has been previously pointed that too high concentrations of tin cause graying of the phosphor and this becomes somewhat apparent at the highest value of tin tested. Therefore, it is demonstrated again that for optimum efficiency, color, and bake-out characteristics of the phosphor, the relationship $$Ca + Sr + Sn = PO_4$$

will hold. Obviously, there are slight variations on either side of this relationship which will still give satisfactory results. In this case, a maximum deviation of the tin concentration of 0.01 on the low side is tolerable and 0.02 on the high side.

Table II

| Ca | Sr | $PO_4$ | Sn | Blue Plaque, Percent of BTP | LPW, 100 hrs. | Color Coordinates | | Bakeout |
|---|---|---|---|---|---|---|---|---|
| | | | | | | $x$ | $y$ | |
| 0.75 | 1.25 | 2.05 | .020 | 122 | 21.9 | .192 | .231 | Poor. |
| ---- | ---- | ---- | .030 | 134 | 25.3 | .182 | .203 | Poor. |
| ---- | ---- | ---- | .040 | 141 | 27.2 | .178 | .195 | Good. |
| ---- | ---- | ---- | .050 | 134 | 27.5 | .179 | .197 | Good. |
| ---- | ---- | ---- | .055 | 134 | 27.1 | .179 | .197 | Good. |
| ---- | ---- | ---- | .060 | 139 | 27.4 | .177 | .197 | Good. |
| ---- | ---- | ---- | .070 | 131 | 27.2 | .177 | .196 | Good. |
| ---- | ---- | ---- | .080 | 119 | 25.7 | .179 | .194 | Good. |

Considering Table III in which the $PO_4$ to (Ca+Sr) ratio is 2.06 to 2.00, the same type of relationship between (Ca+Sr+Sn) to $PO_4$ is evident. In this case, optimum LPW readings are obtained at a minimum deviation from this relationship of 0.01 and a maximum deviation of 0.02. The optimum color of the phosphor is obtained at a maximum deviation of either side of this ratio of 0.005 gm.-atoms Sn. It may also be noted that in this case where the ratio of $PO_4$ to (Ca+Sr) has been increased by 0.01, the range over which good bake-out characteristics are observed has also been increased by 0.01. That is, whereas in Table II at a $PO_4$ to (Ca+Sr) ratio of 2.05 to 2.00, that phosphor having a tin concentration of 0.04 or greater baked out satisfactorily. In Table III at a $PO_4$ to (Ca+Sr) ratio of 2.06 to 2.00, the same tin concentration did not result in proper bake-out. Hence, again it is shown that for optimum LPW, color, and bake-out characteristics the amount of phosphate present in the phosphor must be exactly compensated for by the total concentration of Ca+Sr+Sn.

Table III

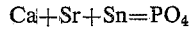

| Ca | Sr | $PO_4$ | Sn | Blue Plaque, Percent of BTP | LPW, 100 hrs. | Color Coordinates | | Bakeout |
|---|---|---|---|---|---|---|---|---|
| | | | | | | $x$ | $y$ | |
| 0.75 | 1.25 | 2.06 | .020 | 133 | 18.4 | .191 | .230 | Poor. |
| ---- | ---- | ---- | .030 | 131 | 21.2 | .186 | .216 | Poor. |
| ---- | ---- | ---- | .040 | 133 | 24.1 | .183 | .209 | Poor. |
| ---- | ---- | ---- | .050 | 136 | 26.7 | .181 | .198 | Good. |
| ---- | ---- | ---- | .055 | 141 | 28.2 | .175 | .191 | Good. |
| ---- | ---- | ---- | .060 | 143 | 29.0 | .176 | .191 | Good. |
| ---- | ---- | ---- | .065 | 137 | 27.8 | .177 | .191 | Good. |
| ---- | ---- | ---- | .070 | 135 | 27.2 | .180 | .195 | Good. |
| ---- | ---- | ---- | .080 | 119 | 23.3 | .176 | .191 | Good. |
| ---- | ---- | ---- | .100 | 89 | ---- | ---- | ---- | |

As an example of the manufacture of one embodiment of a phosphor according to our invention, the following ingredients are mixed as fine powders:

| | Gms. |
|---|---|
| $SrHPO_4$ | 1,032.8 |
| $CaHPO_4$ | 459.5 |
| $(NH_4)_2HPO_4$ | 35.64 |
| $NH_4Cl$ | 57.78 |
| $SnO$ | 36.37 |

The mixture is thoroughly blended and hammermilled twice, blending between the hammermilling operations to obtain a completely homogenized mixture. This mixture is placed in a 2-liter volume silica crucible. A standard silica lid is placed on the crucible and the crucible is placed cold into a hot furnace having a temperature of about 2150° F. and is fired for 2 hours. At the end of the firing time, the crucible is removed and allowed to cool, after which the phosphor is removed from it.

An alternate method uses:

| | Gms. |
|---|---|
| $SrHPO_4$ | 1,032.8 |
| $CaHPO_4$ | 459.5 |
| $(NH_4)_2HPO_4$ | 29.7 |
| $NH_4Cl$ | 62.6 |
| $SnO$ | 30.31 |

These components are thoroughly mixed according to the procedure given above. The blended mixture is placed in a 2-liter volume covered silica crucible and is placed cold into a hot furnace which is at a temperature of 2150° F. and is fired for two hours at that temperature. At the end of the firing time, the crucible is allowed to cool.

A further example uses $Sr_2P_2O_7$ as a raw material.

| | Gms. |
|---|---|
| $Sr_2P_2O_7$ | 1,571.5 |
| $(NH_4)_2HPO_4$ | 29.7 |
| $NH_4Cl$ | 62.6 |
| $SnO$ | 30.31 |

These components are thoroughly blended and mixed according to the precedure in the previous example. This mixture is placed as before in a covered 2-liter crucible and fired 2 hours @ 2100° F. in the manner described previously, and otherwise treated in the same manner.

As an example of a barium-containing modification, for example $(SrBa)_2P_2O_7$:Sn, we can mix the following ingredients as fine powders:

| | Gms. |
|---|---|
| $SrHPO_4$ | 1,445.9 |
| $BaHPO_4$ | 262.8 |
| $(NH_4)_2HPO_4$ | 29.7 |
| $SnO$ | 30.31 |
| $NH_4Cl$ | 62.6 |

The ingredients are blended, hammermilled, and fired and cooled as in the previous example.

As an example of a zinc-containing modification, $(SrZn)_2P_2O_7$:Sn, we can mix the following ingredients in the same manner:

| | Gms. |
|---|---|
| $SrHPO_4$ | 1,239.3 |
| $Zn_2P_2O_7$ | 342.9 |
| $(NH_4)_2HPO_4$ | 29.7 |
| $SnO$ | 30.31 |
| $NH_4Cl$ | 62.6 |

The mixture is then processed as in the preceding example, except that the firing is preferably done at about 1700° C.

As an example of a magnesium-containing modification, $(SrMg)_2P_2O_7$:Sn, we can mix the following ingredients in the same manner:

| | Gms. |
|---|---|
| $SrHPO_4$ | 1,239.3 |
| $Mg_2P_2O_7$ | 306.1 |
| $(NH_4)_2HPO_4$ | 29.7 |
| $SnO$ | 30.31 |
| $NH_4Cl$ | 62.6 |

The mixture is then processed as in the preceding example, except that the firing is preferably done at about 1800° C.

What we claim is:

1. A pyrophosphate phosphor of a metal selected from the group consisting of strontium and strontium plus barium, strontium plus magnesium, strontium plus zinc, strontium plus cadmium, strontium plus aluminum, said phosphor being activated by tin, a substantial part of which is in the stannous state, and in which the number of gram-atoms of strontium, plus the number of gram-atoms of said additional metal when present, plus the number of gram-atoms of tin, is substantially equal to 2.00 for each gram-mol of the phosphate radical.

2. A pyrophosphate phosphor of a metal selected from the group consisting of strontium and strontium plus barium, strontium plus magnesium, strontium plus zinc, strontium plus cadmium, strontium plus aluminum, said phosphor being activated by tin, a substantial part of which is in the stannous state, and in which the number of gram-atoms of strontium, plus the number of gram-atoms of said additional metal when present, plus the number of gram-atoms of tin, is between 1.99 and 2.02 for each gram-mol of the phosphate radical.

3. A pyrophosphate phosphor of a metal selected from the group consisting of strontium and strontium plus an additional metal selected from the group consisting of calcium, barium, magnesium, zinc, cadmium or aluminum, said phosphor being activated by tin, a substantial part of which is in the stannous state, and in which the number of gram-atoms of strontium, plus the number of gram-atoms of said additional metal when present, plus the number of gram-atoms of tin, is substantially equal to 2.00 for each gram-mol of the phosphate radical, and in which the number of gram-atoms of strontium, plus calcium when present, is less than 2.00 for each gram-mol of the phosphate radical.

4. A fluorescent lamp comprising a sealed enclosing envelope, electrodes therein, a gaseous filling therein, and a white coating of the phosphor of claim 1 on the inside surface of said envelope.

5. A fluorescent lamp envelope containing a white, baked-out coating of pyrophosphate phosphor on the inside thereof.

References Cited in the file of this patent

UNITED STATES PATENTS

| 2,339,178 | Lemmers | Jan. 11, 1944 |
| 2,709,766 | Nagy et al. | May 31, 1955 |